United States Patent
Hsieh et al.

(10) Patent No.: US 9,744,675 B1
(45) Date of Patent: Aug. 29, 2017

(54) GRIPPER CAPABLE OF LIFTING A WORK PIECE

(71) Applicant: HIWIN TECHNOLOGIES CORP., Taichung (TW)

(72) Inventors: Wu-Teng Hsieh, Taichung (TW); Shu-Hung Liu, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 0 days.

(21) Appl. No.: 15/612,362

(22) Filed: Jun. 2, 2017

(51) Int. Cl.
  *B66C 1/42* (2006.01)
  *B25J 15/00* (2006.01)
  *B25J 15/08* (2006.01)

(52) U.S. Cl.
  CPC ......... *B25J 15/0028* (2013.01); *B25J 15/08* (2013.01)

(58) Field of Classification Search
  CPC .. A01B 1/16; A01B 1/18; G01N 2035/00326; G01N 35/0099; B25G 3/02; B25J 15/026; B25J 15/0028; B25J 15/08; B25J 1/04; B63G 7/04
  See application file for complete search history.

(56) References Cited

U.S. PATENT DOCUMENTS

| | | | | |
|---|---|---|---|---|
| 4,975,018 A | * | 12/1990 | Langenbacher | B23Q 7/043 198/750.11 |
| 6,177,050 B1 | * | 1/2001 | Bybee | G01N 35/026 422/107 |
| 6,293,750 B1 | * | 9/2001 | Cohen | G01N 35/0099 414/744.4 |
| 6,843,357 B2 | * | 1/2005 | Bybee | B25J 18/04 198/345.3 |
| 9,335,337 B2 | | 5/2016 | Jones et al. | |

FOREIGN PATENT DOCUMENTS

| | | |
|---|---|---|
| CN | 103358314 B | 10/2013 |
| JP | 2007118148 A | 5/2007 |

* cited by examiner

*Primary Examiner* — Stephen Vu
(74) *Attorney, Agent, or Firm* — Wang Law Firm, Inc.

(57) ABSTRACT

A gripper capable of lifting a work piece includes: a body including a sliding direction and a lifting axis defining a first angle relative to the sliding direction; a plurality of sliding blocks slidably mounted on the body and located at two sides of the lifting axis to move in the sliding direction toward or away from each other, wherein the sliding blocks each include a receiving hole at a second angle relative to the sliding direction; and a plurality of fingers slidably disposed in the receiving holes, and each including: a nose portion disposed in the receiving holes, and a finger portion to grip the work piece. When the sliding blocks are in the lifting position, the fingers are retracted into the receiving holes to make the finger portions move up along the lifting axis toward the body by a certain distance while clamping the work piece.

7 Claims, 8 Drawing Sheets

GRIPPER CAPABLE OF LIFTING A WORK PIECE

BACKGROUND

Field of the Invention

The present invention relates to a gripper, and more particularly to a gripper capable of lifting a work piece.

Related Prior Art

Figure 1A:
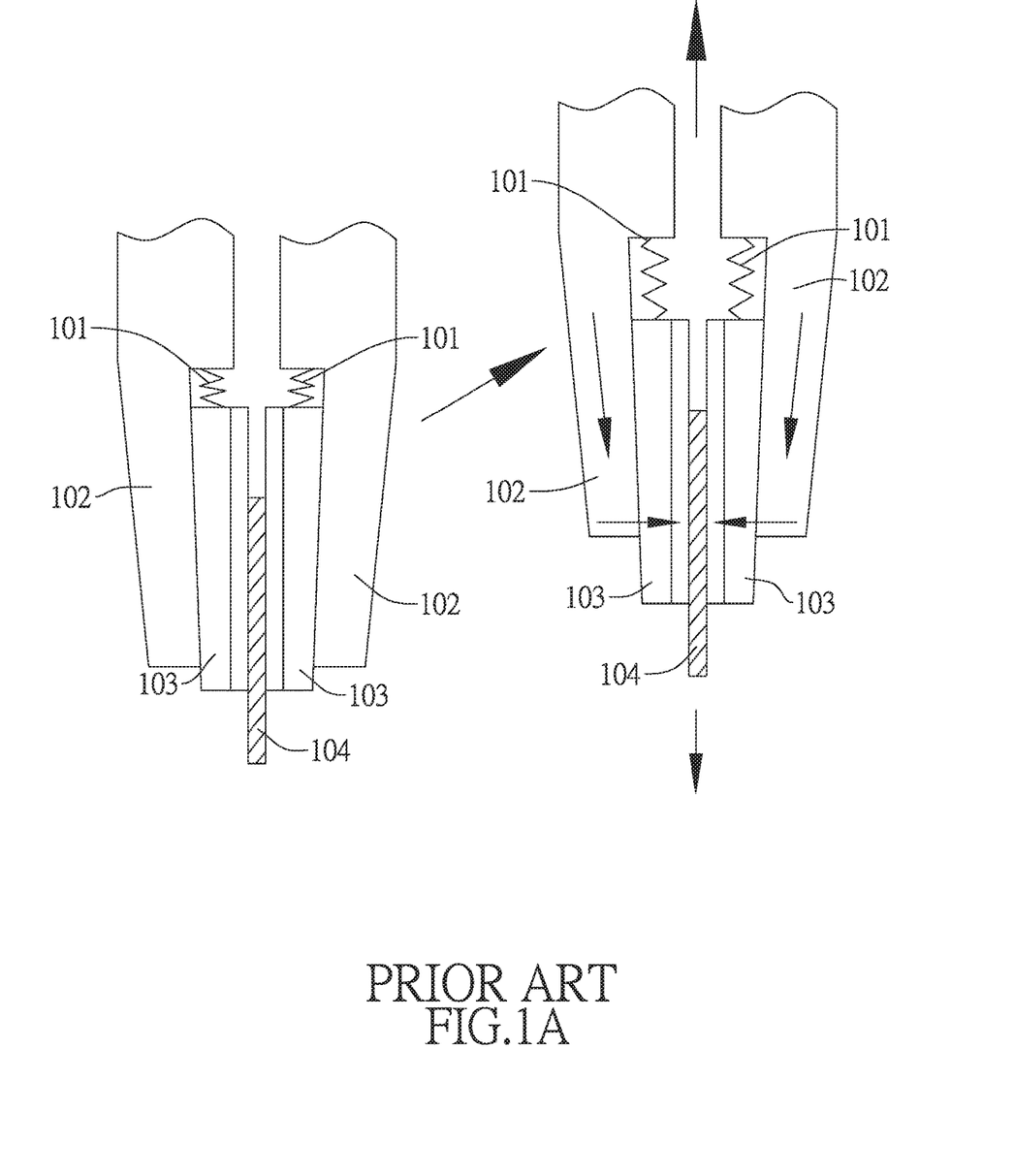
FIG. 1A shows the gripper of a manipulator disclosed in Japan Patent (JP 2007118148A)

FIG. 1A shows a gripper of a manipulator disclosed in Japan Patent (JP 2007118148A), wherein springs 101 cooperate with a pair of wedge mechanisms each of which consists of a clamping jaw 102 and a gripping member 103 to improve gripping stability. When a work piece 104 gripped by the gripper slides downward, the gripping members 103 will move along with the work piece 104 to produce an inward clamping force to prevent dropping of the work piece 104. However, after the gripper grips the work piece 104 but prior to moving it to the destination, an extra power source is required to lift the work piece 104, which highlights the disadvantage of low efficiency. Besides, this gripper further has the following disadvantages: the gripper can not be inverted, otherwise it is unable to maintain clamping force; the position of the work piece 104 is likely to change during the clamping process, which makes the locating operation difficult when releasing the work piece.

Figure 1B:
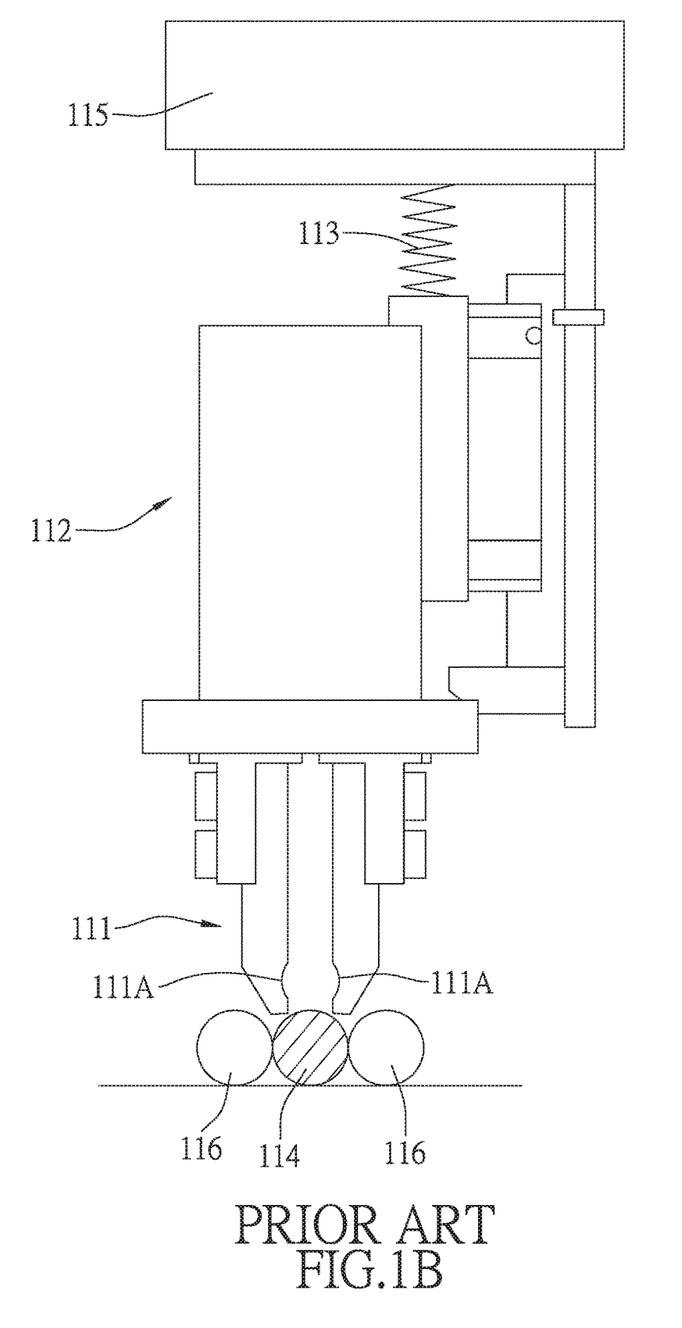
FIG. 1B shows the another gripper of a manipulator disclosed a Chinese Patent (CN 103358314B)

FIG. 1B shows another gripper of a manipulator disclosed a Chinese Patent (CN 103358314B), wherein a spring 113 is connected between a chuck 112 and a body 115, before gripping, the unopened gripper 111 moves downward along with the chuck 112 to make the spring 113 produce a prestress. When the chuck 112 opens, the prestress of the spring 113 is released to push down the gripper 111, as a result, the clamping jaws 111A move along the lateral edge of the work piece 114 while pushing away neighboring work pieces 116, so that the gripper 111 is able to pick up one of the work pieces 114 even when there are many work pieces 114 closely arranged in parallel. However, after the gripper 111 grips the work piece 114 but prior to moving it to the destination, an extra power source is required to lift the work piece 114, which highlights the disadvantage of low efficiency. Besides, this gripper further has the disadvantage that the gripper 111 is structurally complicated and inconvenient to operate.

Figure 1C:
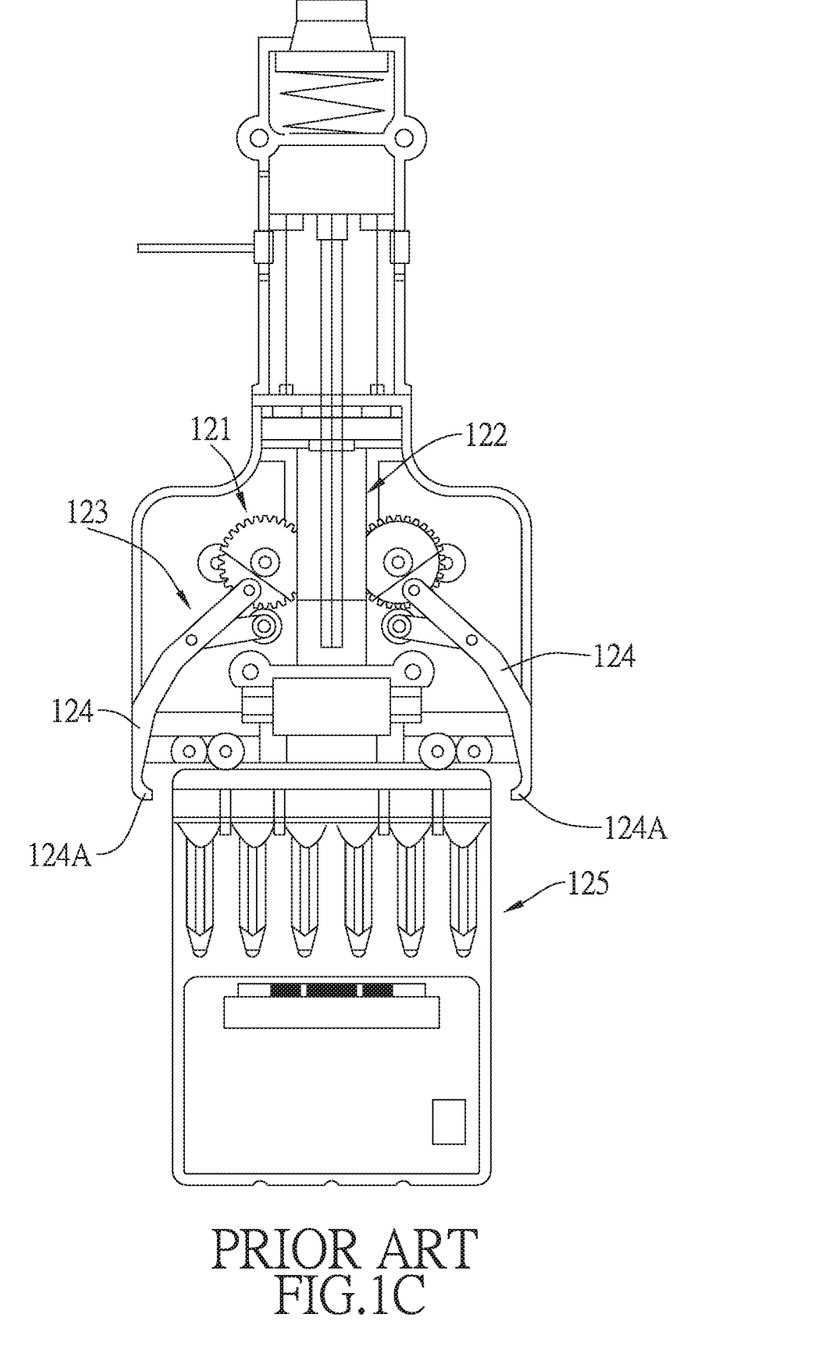
FIG. 1C shows the gripping device as disclosed in US Patent (U.S. Pat. No. 9,335,337B2)
Figure 2:
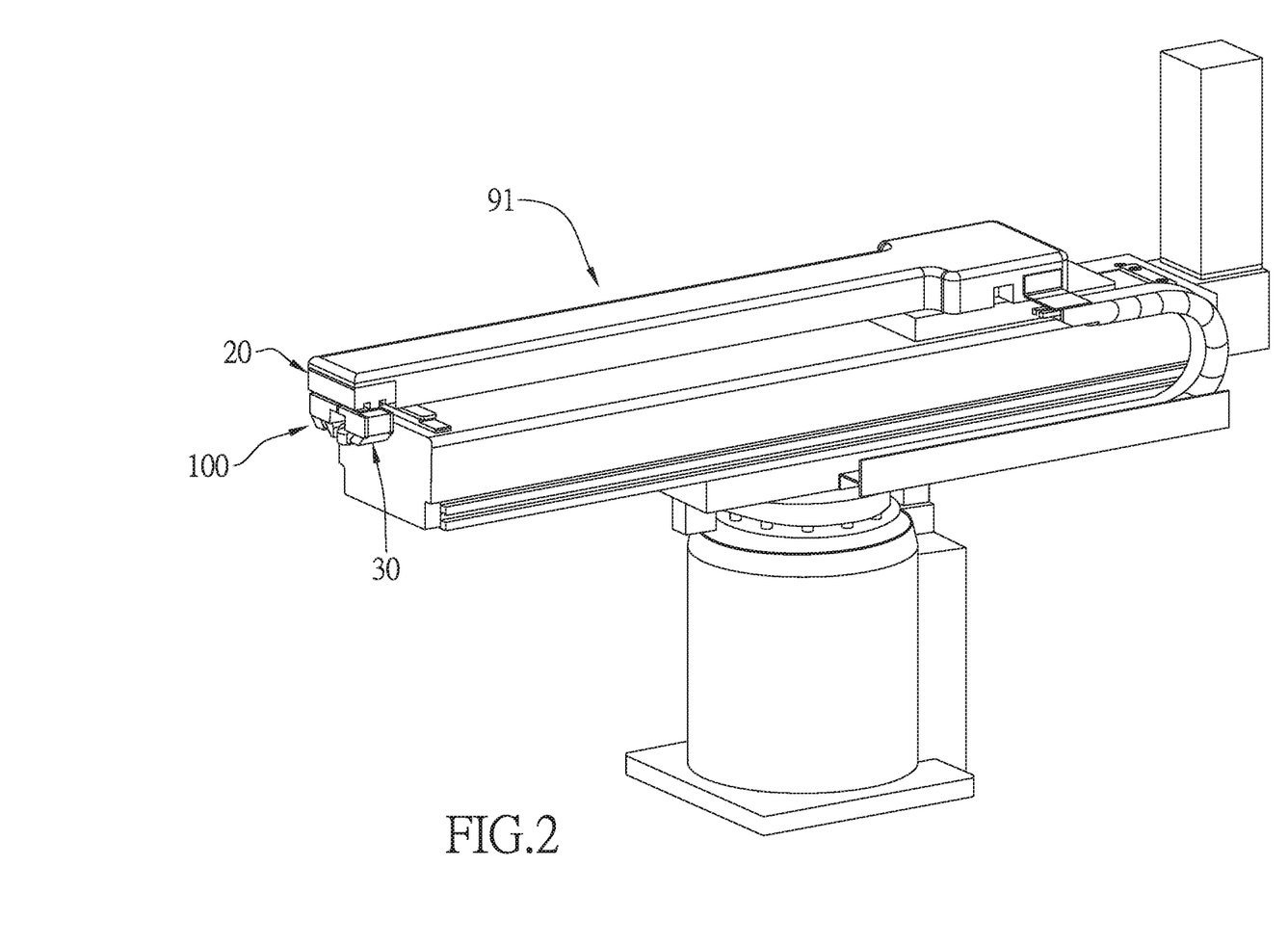
FIG. 2 is a perspective view of the gripper capable of lifting a work piece in accordance with the preferred embodiment of the present invention, wherein the gripper is assembled onto a manipulator.
Figure 3:
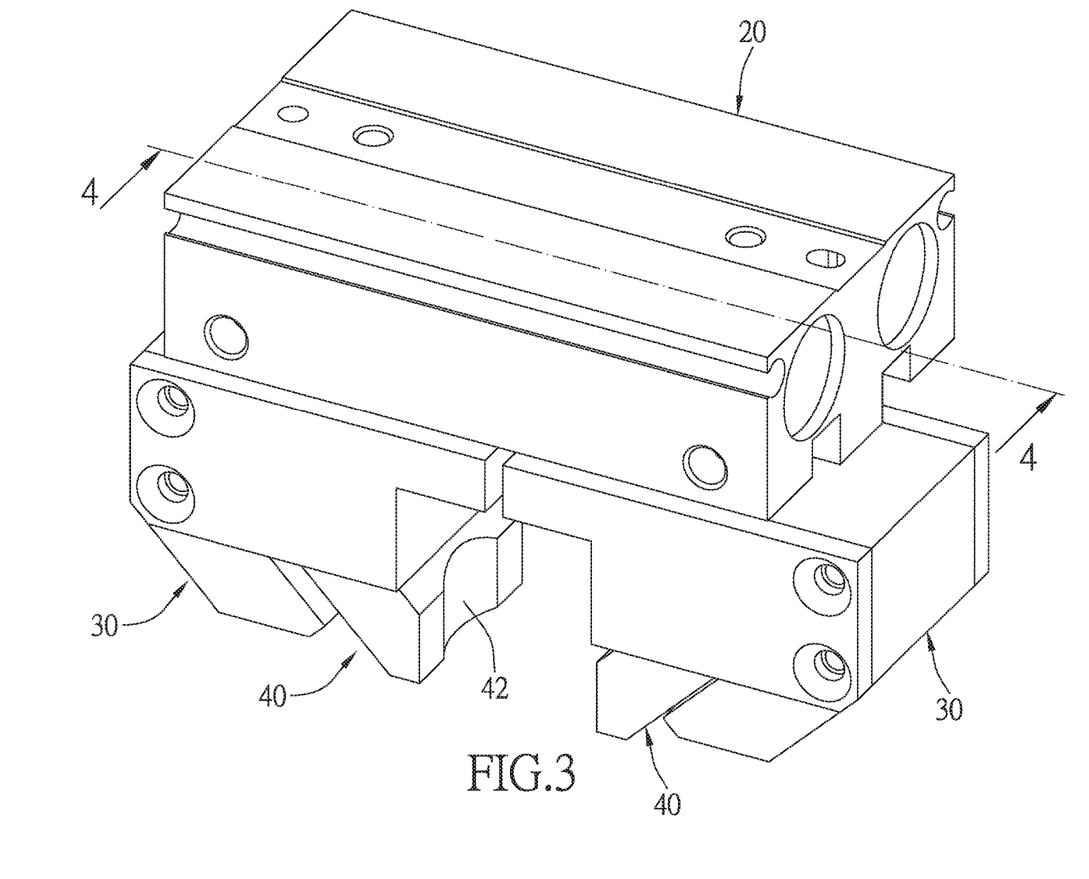
FIG. 3 is a perspective view of the gripper capable of lifting a work piece in accordance with the preferred embodiment of the present invention.

FIG. 1C shows a gripping device as disclosed in US Patent (U.S. Pat. No. 9,335,337B2), wherein gears 121, a lead screw 122 and a linkage mechanism 123 cooperate with one anther to enable the clamping jaws 124 to grip and lift the work piece 125 simultaneously. Although the work piece 125 can be lifted while being gripped, the gripping operation requires the use of the gears 121, the lead screw 122 and the linkage mechanism 123, especially the use of the linkage mechanism 123 to grip the work piece 125, which highlights the disadvantages of complicated structure and insufficient structural strength. In addition, once the size of the finger portions 124A of the clamping jaws 124 is fixed, the linkage mechanism 123 restricts the movement of the clamping jaws 124, consequently restricting the capability of gripping other sized work pieces 125.

The present invention has arisen to mitigate and/or obviate the afore-described disadvantages.

SUMMARY

One objective of the present invention is to provide a gripper capable of lifting a work piece, wherein the gripper has a simple structure and is easy to operate and capable of gripping and lifting the work piece.

To achieve the above objective, a gripper capable of lifting work pieces in accordance with the present invention comprises:

a body including a sliding direction and a lifting axis which defines a first angle with respect to the sliding direction; a plurality of sliding blocks being slidably mounted on the body and located at two sides of the lifting axis and able to move in the sliding direction toward or away from each other, wherein the sliding blocks each include a receiving hole which defines a second angle with respect to the sliding direction and has an opening which opens towards the lifting axis, and a stop portion provided in the receiving hole, the sliding blocks are selectively movable among a normal position, a clamping position and a lifting position; and a plurality of fingers being slidably disposed in the receiving holes of the sliding blocks, and each including: a nose portion which is slidably disposed in a corresponding one of the receiving holes and located between a bottom surface and the stop portion of the corresponding one of the receiving holes, and a finger portion which is located outside the corresponding one of the receiving holes and used to grip a work piece;

when the sliding blocks are in the normal position, the nose portion of the respective fingers keeps pressing against the corresponding stop portion, and the finger portions do not grip the work piece; when the sliding blocks move from the normal position to the clamping position, the nose portion of the respective fingers keeps pressing against the corresponding stop portion, and the finger portions grip the work piece; when the sliding blocks move from the clamping position to the lifting position, the fingers are retracted into the receiving holes to make the nose portion of the respective fingers move away from the corresponding stop portion, meanwhile, the finger portions move up along the lifting axis toward the body by a certain distance while clamping the work piece.

Preferably, the first angle is 90 degrees.

The gripper further comprises a plurality of elastic members received in the receiving holes of the sliding blocks, and each are located between the bottom surface of the corresponding one of the receiving holes and the fingers, so that, when the sliding blocks are in the normal and clamping positions, the nose portion of the respective fingers keeps pressing against the corresponding stop portion.

Preferably, the elastic members are compression springs.

Preferably, a first restricting recess is formed at the bottom surface of each of the receiving holes, each of the fingers further includes a second restricting recess located corresponding to the first restricting recess, and the elastic members each have two ends disposed in the first restricting recess and the second restricting recess, respectively.

Preferably, a distance between the sliding blocks when they are in the clamping position is smaller than a distance between the sliding blocks when they are in the normal position, and a distance between the sliding blocks when they are in the lifting position is smaller than the distance between the sliding blocks when they are in the clamping position.

Preferably, there are two said sliding blocks and two said fingers.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

DETAILED DESCRIPTION

The present invention will be clearer from the following description when viewed together with the accompanying drawings, which show, for purpose of illustrations only, the preferred embodiment in accordance with the present invention.

Referring to FIGS. 2-5, a gripper 100 capable of lifting a work piece in accordance with the preferred embodiment of the present invention is applied to a manipulator 91 and controlled to move by the manipulator 91. The gripper 100 essentially comprises: a body 20, two sliding blocks 30, two fingers 40 and two elastic members 50.

The body 20 is assembled onto the manipulator 91, and includes a sliding direction 21 and a lifting axis 23 which defines a first angle 22 with respect to the sliding direction 21. In this embodiment, the first angle 22 is 90 degrees.

Figure 5:
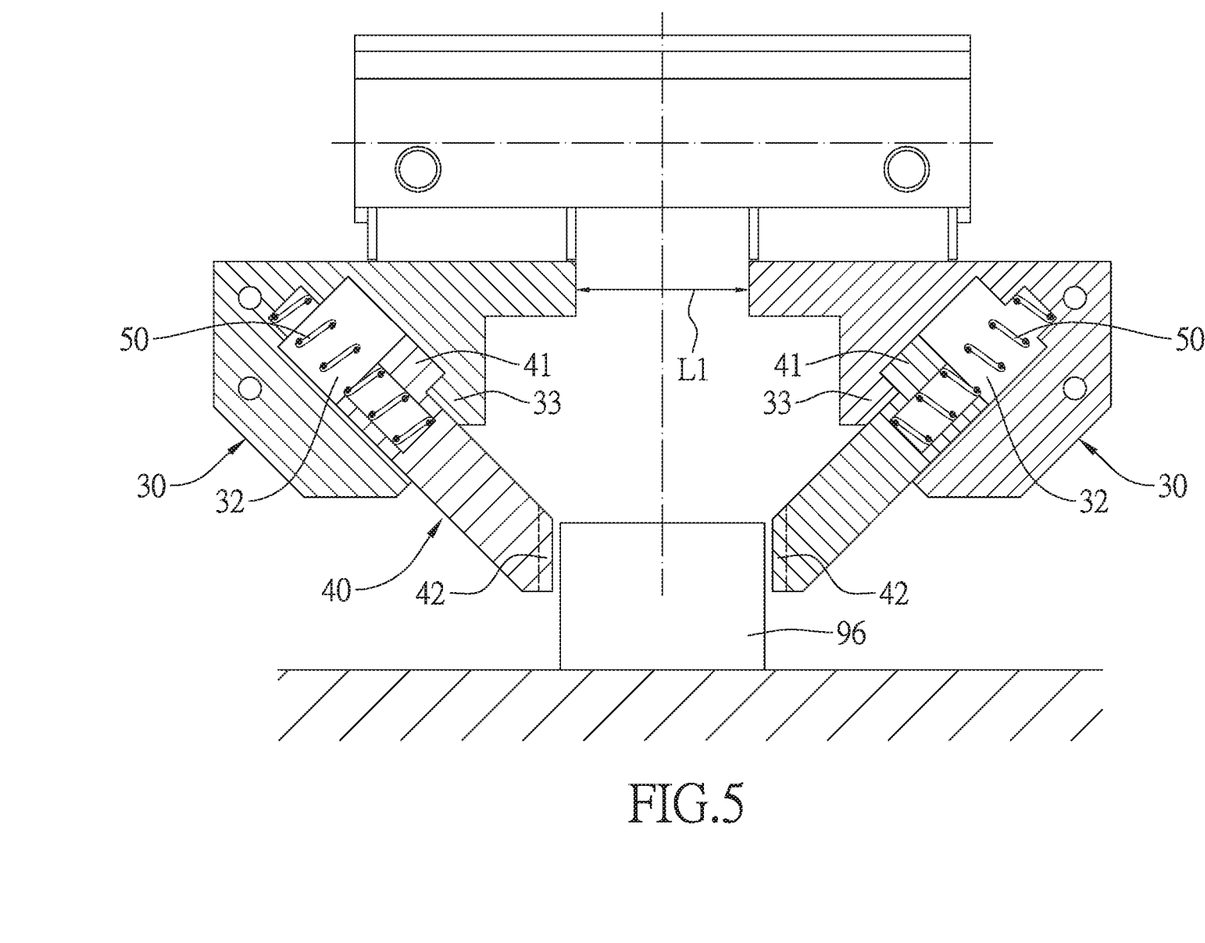
FIG. 5 is an operational view of the present invention showing that the two sliding blocks are in the normal position.
Figure 6:
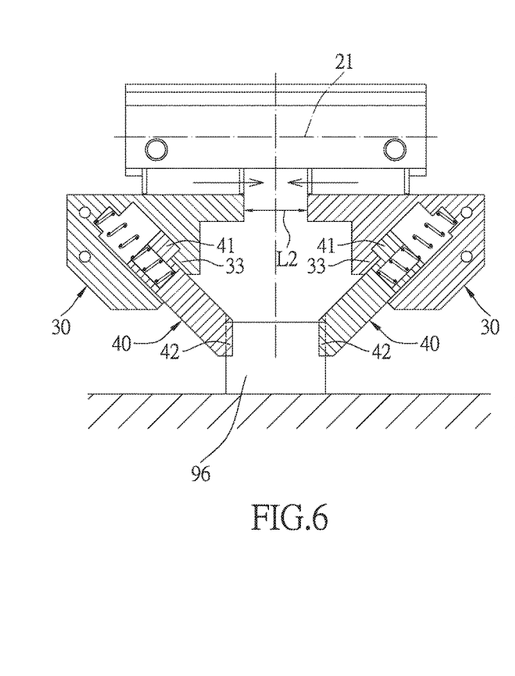
FIG. 6 is an operational view of the present invention showing that the two sliding blocks are in the clamping position.
Figure 7:
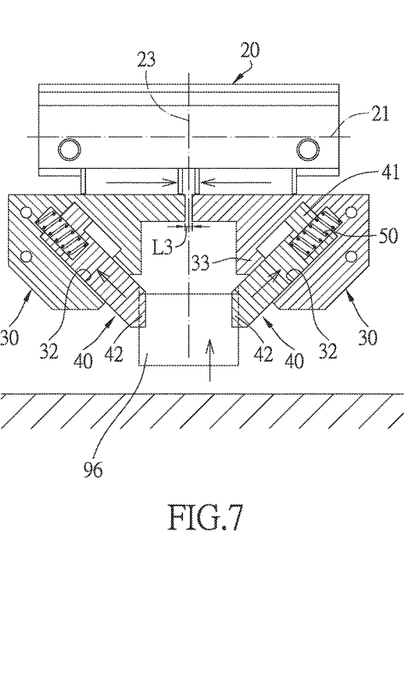
FIG. 7 is an operational view of the present invention showing that the two sliding blocks are in the lifting position.

The two sliding blocks 30 are slidably mounted on the body 20 and located at two sides of the lifting axis 23 and able to move toward or away from each other along the sliding direction 21. The two sliding blocks 30 each include a receiving hole 32 which defines a second angle 31 with respect to the sliding direction 21 and has an opening 321 which opens towards the lifting axis 23, and a stop portion 33 provided in the receiving hole 32. The two sliding blocks 30 are selectively movable among a normal position (as shown in FIG. 5), a clamping position (as shown in FIG. 6) and a lifting position (as shown in FIG. 7). In this embodiment, at a bottom surface 322 of the receiving hole 32 of each of the two sliding blocks 30 is formed a first restricting recess 323.

Figure 4:
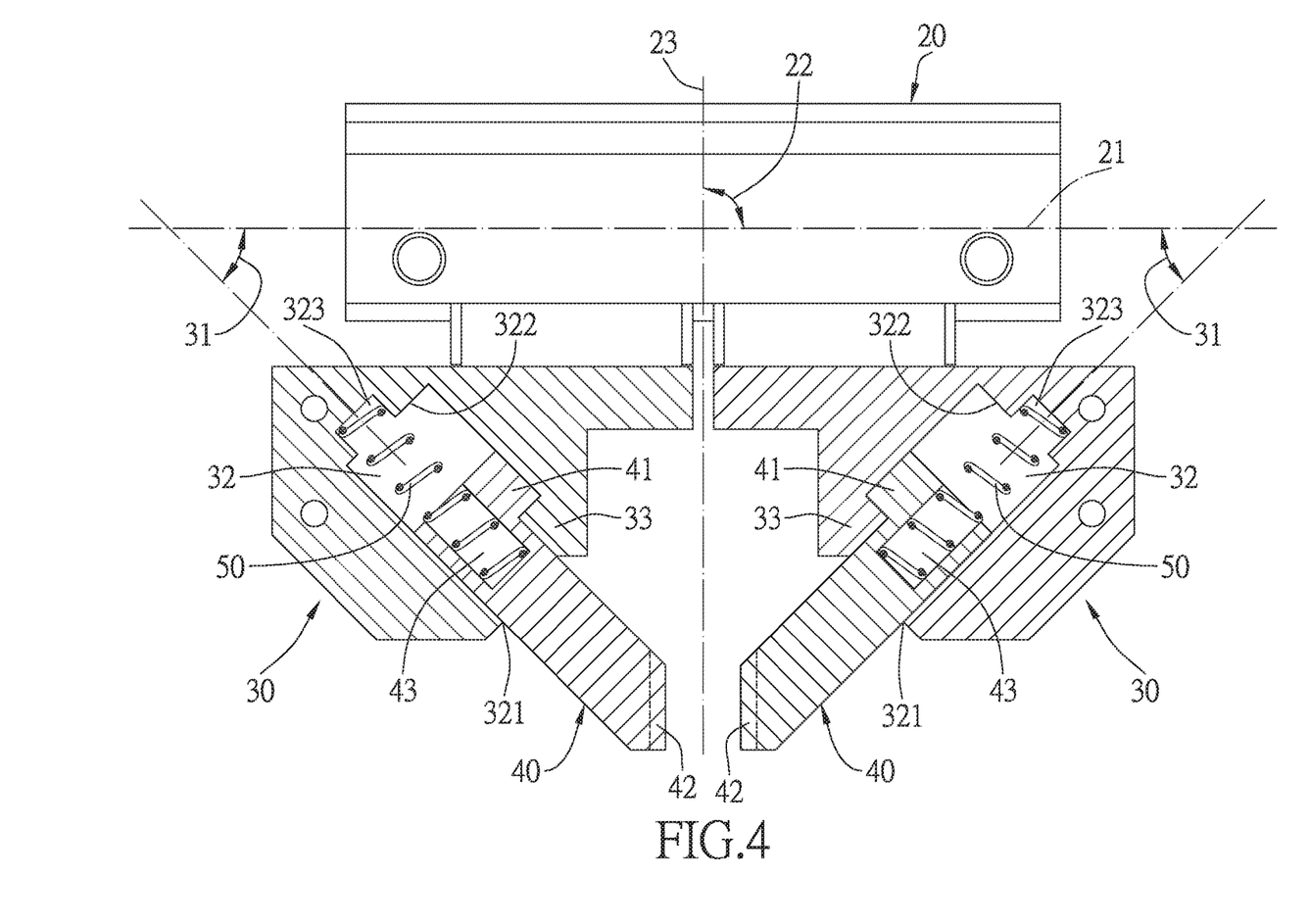
FIG. 4 is a cross sectional view taken along the line 4-4 of FIG. 3.

The two fingers 40 are slidably disposed in the receiving holes 32 of the two sliding blocks 30, and each include: a nose portion 41 which is slidably disposed in a corresponding one of the receiving holes 32 and located between the bottom surface 322 and the stop portion 33, and a finger portion 42 which is located outside the corresponding one of the receiving holes 32 and used to grip a work piece 96. In this embodiment, each of the two fingers 40 further includes a second restricting recess 43 located corresponding to the first restricting recess 323.

The two elastic members 50 are received in the receiving holes 32 of the two sliding blocks 30, and each have two ends disposed in the first restricting recess 323 and the second restricting recess 43 of the corresponding one of the receiving holes 32, respectively, so that, when the two sliding blocks 30 are in the normal and clamping positions, the nose portion 41 of the respective fingers 40 can keep pressing against the corresponding stop portion 33. Besides, the elastic members 50 each have two ends disposed in the first restricting recess 323 and the second restricting recess 43 of the corresponding one of the receiving holes 32, respectively, which can improve the stability of the elastic members 50. In this embodiment, the two elastic members 50 are compression springs.

What mentioned above are the structural relations of the main components of the preferred embodiment of the invention. It is to be noted that the quantity of the sliding blocks 30, the fingers 40 and the elastic members 50 is two, but it can also be three, four or even more, to enable the gripper of the invention to have three, four or multiple jaws. For the operation and function of the embodiment, please refer to the below description.

When the gripper 100 is manipulated by the manipulator 91 to grip the work piece 96, as shown in FIG. 5, the two sliding blocks 30 are in the normal position, the work piece 96 is located between the finger portions 42 of the two fingers 40, and the finger portions 42 have not gripped the work piece 96. At this moment, the two fingers 40 are pushed by the two elastic members 50 to make the nose portion 41 of the respective fingers 40 keep pressing against the corresponding stop portion 33, namely, the two fingers 40 are maintained in the most protruding position (most extended position) from the receiving holes 32 of the sliding blocks 30.

Referring then to FIG. 6, which shows that the two sliding blocks 30 are in the clamping position, the two sliding blocks 30 are manipulated by the manipulator 91 to move in the sliding direction 21 toward each other from the normal position as shown in FIG. 5. Meanwhile, the two fingers 40 also move toward each other, namely, a distance L2 between the two sliding blocks 30 is smaller than a distance L1 between the two sliding blocks 30 when they are in the normal position as shown in FIG. 5. The two fingers 40 move toward each other until the two finger portions 42 clamp the work piece 96, and the nose portion 41 of the respective fingers 40 still keeps pressing against the corresponding stop portion 33, at this moment, the sliding blocks 30 are in the clamping position.

Finally, please refer to FIG. 7, which shows that the two sliding blocks 30 are in the lifting position, the two sliding blocks 30 are controlled by the manipulator 91 to move in the sliding direction 21 toward each other from the clamping position as shown in FIG. 6, which makes the distance L3 between the two sliding blocks 30 smaller than a distance L2 between the two sliding blocks 30 when they are in the clamping position as shown in FIG. 6. At this moment, the finger portions 42 of the two fingers 40 are clamped against and stopped by the work piece 96, therefore, the distance between the two fingers 40 does not anymore, and the two sliding blocks 30 still keep moving in the sliding direction 21 toward each other to cause retraction of the fingers 40 into the receiving holes 32 of the sliding blocks 30. Since the two sliding blocks 30 are slidably disposed on the body 20 and movable along the sliding direction 21, and each of the receiving holes 32 of the sliding blocks 30 defines the second angle 31 (as shown in FIG. 4) with respect to the sliding direction 21, so that, during retraction, the two fingers 40 are guided by the receiving holes 32 to move vertically upward without being able to move close to each other, and as a result, the finger portions 42 will move up along the lifting axis 23 toward the body 20 by a certain distance while clamping the work piece 96. In this way, the work piece 96 can be gripped and lifted at the same time.

During the retraction process of the two fingers 40, the nose portions 41 will move away from the stop portions 33 of the receiving holes 32 to compress the elastic members 50, so that the compressed elastic members 50 will provide elastic force to reinforce the clamping of the work piece 96, plus the clamping force provided by the two sliding blocks 30 which are controlled to move toward each other, the work piece 96 can be assuredly prevented from falling off the two fingers 40.

It is to be noted that the present invention has the following advantages:

First of all, unrestricted assembling direction: the gripper 100 of the invention is capable of lifting while gripping the work piece 96 due to the fact that the two sliding blocks 30 are slidably disposed on the body 20 and movable along the sliding direction 21, and each of the receiving holes 32 of the sliding blocks 30 defines the second angle 31 with respect to the sliding direction 21. Therefore, when the gripper 100 is used in an inverted manner or even in a lateral manner, the work piece 96 can still be gripped, lifted, lowered or laterally pulled by selectively moving the sliding blocks 30 among the normal position, the clamping position and the lifting position, and thus the assembling direction of the gripper 100 is not restricted.

Furthermore, simple structure of the gripper 100: the gripper 100 only consists of one body 20, two sliding blocks 30, two fingers 40 and two elastic members 50, and no complicated structure design used in the respective components, more particularly no designs that require precise calculation and assembly, such as the gears, lead screw and linkage mechanism, are used. Hence, the gripper 100 has a very simple structure, which effectively reduces the cost of parts and assembly cost, while improving the structure strength.

Finally, easy operation: the operation of the gripper 100 only requires the two sliding blocks 30 to slide in the sliding direction 21 toward or away from each other, then the sliding blocks 30 can selectively movable among the normal position, the clamping position and the lifting position to be able to grip and lift the work piece 96. Therefore, the gripper 100 is easy to operate.

While we have shown and described various embodiments in accordance with the present invention, it is clear to those skilled in the art that further embodiments may be made without departing from the scope of the present invention.

What is claimed is:

1. A gripper capable of lifting a work piece, comprising:
    a body including a sliding direction and a lifting axis which defines a first angle with respect to the sliding direction;
    a plurality of sliding blocks being slidably mounted on the body and located at two sides of the lifting axis and able to move in the sliding direction toward or away from each other, wherein the sliding blocks each include a receiving hole which defines a second angle with respect to the sliding direction and has an opening which opens towards the lifting axis, and a stop portion provided in the receiving hole, the sliding blocks are selectively movable among a normal position, a clamping position and a lifting position; and
    a plurality of fingers being slidably disposed in the receiving holes of the sliding blocks, and each including: a nose portion which is slidably disposed in a corresponding one of the receiving holes and located between a bottom surface and the stop portion of the corresponding one of the receiving holes, and a finger portion which is located outside the corresponding one of the receiving holes and used to grip the work piece;
    when the sliding blocks are in the normal position, the nose portion of the respective fingers keeps pressing against the corresponding stop portion, and the finger portions do not grip the work piece; when the sliding blocks move from the normal position to the clamping position, the nose portion of the respective fingers keeps pressing against the corresponding stop portion, and the finger portions grip the work piece; when the sliding blocks move from the clamping position to the lifting position, the fingers are retracted into the receiving holes to make the nose portion of the respective fingers move away from the corresponding stop portion, meanwhile, the finger portions move up along the lifting axis toward the body by a certain distance while clamping the work piece.

2. The gripper as claimed in claim 1, wherein the first angle is 90 degrees.

3. The gripper as claimed in claim 1 further comprising a plurality of elastic members received in the receiving holes of the sliding blocks, and each are located between the bottom surface of the corresponding one of the receiving holes and the fingers, so that, when the sliding blocks are in the normal and clamping positions, the nose portion of the respective fingers keeps pressing against the corresponding stop portion.

4. The gripper as claimed in claim 3, wherein the elastic members are compression springs.

5. The gripper as claimed in claim 3, wherein a first restricting recess is formed at the bottom surface of each of the receiving holes, each of the fingers further includes a second restricting recess located corresponding to the first restricting recess, and the elastic members each have two ends disposed in the first restricting recess and the second restricting recess, respectively.

6. The gripper as claimed in claim 1, wherein a distance between the sliding blocks when they are in the clamping position is smaller than a distance between the sliding blocks when they are in the normal position, and a distance between the sliding blocks when they are in the lifting position is smaller than the distance between the sliding blocks when they are in the clamping position.

7. The gripper as claimed in claim 1, wherein there are two said sliding blocks and two said fingers.

* * * * *